(12) United States Patent
Petev et al.

(10) Patent No.: US 7,721,256 B2
(45) Date of Patent: May 18, 2010

(54) METHOD AND SYSTEM TO PROVIDE ACCESS TO FACTORIES IN A NAMING SYSTEM

(75) Inventors: Petio Petev, Sofia (BG); Elitsa Pancheva, Sofia (BG); Henning Blohm, Walldorf (DE)

(73) Assignee: SAP AG, Walldorf (DE)

( * ) Notice: Subject to any disclaimer, the term of this patent is extended or adjusted under 35 U.S.C. 154(b) by 1585 days.

(21) Appl. No.: 10/856,051

(22) Filed: May 27, 2004

(65) Prior Publication Data

US 2005/0278223 A1    Dec. 15, 2005

(51) Int. Cl.
*G06F 9/44* (2006.01)
*G06F 15/16* (2006.01)
*G06F 15/167* (2006.01)

(52) U.S. Cl. ........................ 717/118; 709/203; 709/217
(58) Field of Classification Search ........................ None
See application file for complete search history.

(56) References Cited

U.S. PATENT DOCUMENTS

| | | | |
|---|---|---|---|
| 5,577,252 A * | 11/1996 | Nelson et al. ................ | 718/100 |
| 5,745,683 A * | 4/1998 | Lee et al. ..................... | 709/250 |
| 6,154,777 A * | 11/2000 | Ebrahim ....................... | 709/227 |
| 6,236,999 B1 | 5/2001 | Jacobs et al. | |
| 6,363,421 B2 | 3/2002 | Barker et al. | |
| 6,389,451 B1 | 5/2002 | Hart | |
| 6,466,570 B1 * | 10/2002 | Low et al. .................... | 370/352 |
| 6,711,682 B1 | 3/2004 | Capps | |
| 6,834,284 B2 * | 12/2004 | Acker et al. ................ | 707/103 R |
| 6,836,462 B1 | 12/2004 | Albert et al. | |
| 7,308,475 B1 * | 12/2007 | Pruitt et al. .................. | 709/203 |
| 2002/0188657 A1 | 12/2002 | Traversat et al. | |
| 2003/0028585 A1 | 2/2003 | Yeager et al. | |
| 2003/0195870 A1 * | 10/2003 | Newcombe et al. ............ | 707/3 |
| 2005/0270973 A1 | 12/2005 | Raev et al. | |

OTHER PUBLICATIONS

P. Mockapetris, RFC 1035, "Domain Name—Implementation and Specification", Nov. 1987, IETF, p. 1-56.*
Perrone et al., "Build Java Enterprise System with J2EE", chapter 19, Naming Services Jun. 2000 published by Sams, pp. 1-27.*
Rosanna Lee, "The JNDI Tutorial, Building Directory-Enabled Java Applicaitons" published online by Sun, revised Nov. 1, 2002 pp. 1-1170.*
Sun Microsystems, Inc., *JNDI: Java Naming and Directory Interface*, Java Naming and Directory, Jan. 29, 1998, pp. ii-63, Palo Alto, California.

(Continued)

*Primary Examiner*—Tuan Q Dam
*Assistant Examiner*—Zheng Wei
(74) *Attorney, Agent, or Firm*—Schwegman, Lundberg & Woessner, P.A.

(57) ABSTRACT

A method and system to provide easy access to factories in a naming service. The system receives an indication that a factory is needed by a client. A plurality of resolvers are checked in turn to find the factory indicated. If a resolver that can provide the factory is found, the factory is returned to the client. In one embodiment, resolvers register with a resolver manager that performs the checking in response to a naming operation. Because the resolver manager can access all registered resolvers, access to the factories is independent of a class path of the user.

26 Claims, 6 Drawing Sheets

OTHER PUBLICATIONS

Sun Microsystems, Inc., *JNDI SPI: Java Naming and Directory Service Provider Interface*, Java Naming and Directory SPI, Jan. 29, 1998, pp. ii-43.

Frey, Gregory K., *Final Office Action*, dated May 15, 2007, U.S. Appl. No. 10/836,851, filed Apr. 30, 2004, 15 pgs.

Frey, Gregory K., *Non-Final Office Action*, dated Dec. 12, 2006, U.S. Appl. No. 10/836,851, filed Apr. 30, 2004, 10 pgs.

Frey, Gregory K., *Non-Final Office Action*, dated Oct. 26, 2007, U.S. Appl. No. 10/836,851, filed Apr. 30, 2004, 11 pgs.

Petev, Petio, et al., *Non-Final Office Action* dated Dec. 12, 2007, U.S. Appl. No. 10/856,047, filed May 27, 2004, 21 pgs.

Petev, Petio, et al., *Non-Final Office Action*, dated Dec. 5, 2006, U.S. Appl. No. 10/856,053, filed May 27, 2004, 15 pgs.

Petev, Petio, et al., *Non-Final Office Action*, dated May 31, 2007, U.S. Appl. No. 10/856,053, filed May 27, 2004, 16 pgs.

Petev, Petio, et al., *Final Office Action*, dated Nov. 15, 2007, U.S. Appl. No. 10/856,053, filed May 27, 2004, 15 pgs.

Petev, Petio, et al., *Final Office Action* dated Jun. 26, 2008, U.S. Appl. No. 10/856,047, filed May 27, 2004, 23 pgs.

\* cited by examiner

METHOD AND SYSTEM TO PROVIDE ACCESS TO FACTORIES IN A NAMING SYSTEM

BACKGROUND

1. Field of the Invention

Embodiments of the invention relate to naming. More specifically, embodiments relate to accessing factories in the naming system.

2. Background

Naming service broadly refers to the mechanism by which an object is associated with a name and by which objects may be found given their names. Each name is generated by a set of syntactic rules called, "naming convention." An atomic name is an indivisible component of a name as defined by the naming convention. The association of the atomic name with an object is called, "binding." Some objects cannot be stored directly so they are put in the system as references. A "reference" is an object, which contains one or some addresses of objects which themselves are not directly bound to the naming system. Every name is interpreted relative to some context, and every naming operation is performed in a context object. A "context" is a set of bindings in which names are relative to a certain naming convention. A client may obtain an initial context object that provides a starting point for resolution of names in the naming system. Every naming system consists of contexts of a certain type (one and the same naming convention) that provide the same identical set of operations. Every operation is relative to a certain namespace. A "namespace" is the set of names in the naming system. The naming service organization of the namespace is a treelike structure of naming context objects that can be traversed to locate a particular name.

A directory service is a naming service that allows each bound object to be associated with attributes and provides a way to retrieve an object by looking up some of its attributes rather than its name (search). The "attributes" are object characteristics. Both the attributes and the object itself form a directory object. A "directory" is a linked set of directory objects.

In a Java context, basic support for the naming and directory service is provided by a Java Naming and Directory Interface (JNDI) such as specified in *JNDI: Java Naming and Directory Interface*, Version 1.2, published by Sun Microsystems of Mountain View, Calif. and subsequent revisions thereof (the JNDI Specification). The JNDI Specification meets the system requirements of Java 2 Enterprise Edition (J2EE). These requirements are defined in the Java 2 Enterprise Edition Specification 1.3, published Jul. 27, 2001 or subsequent versions thereof (the J2EE Standard). JNDI is defined to be independent of any specific directory service implementation. This permits a variety of directories to be accessed in a common way.

Using standard JNDI it is difficult to customize implementations of initial context factories, object factories, uniform resource locator (URL) factories, and state factories. In some cases, it is desirable to permit a client to register and use its own implementations of such factories. Unfortunately, in existing systems, if such implementations are not available in the class path of a client, this is not possible. This issue arises in the context of classloading. A "class loader" can create a new instance of a class from the class name. Each component in a typical system may have its own class loader that can load one or more classes. Unfortunately, if the class name of a given factory is not among those in a particular class loader, the loader cannot load a new instance of this factory class.

Typically, the naming service provider provides several implementations of different factories so that the client's developer can read in the documentation the benefit of each factory and to choose which one to use. Then the client merely specifies the class name of the chosen factory in the environment properties and the role of the classloader is to load a new instance of this class by given class name. By default only a single InitialContextFactoryBuilder and ObjectFactoryBuilder implementation can be registered in javax.naming.spi.NamingManager object of a certain virtual machine (VM).

SUMMARY

A method and system to provide access to factories in a naming service. The system receives an indication that a factory is needed by a client. A plurality of resolvers are checked in turn to find the factory indicated. If a resolver that can provide the factory is found, the factory is returned to the client. In one embodiment, resolvers register with a resolver manager that performs the checking in response to a naming operation.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
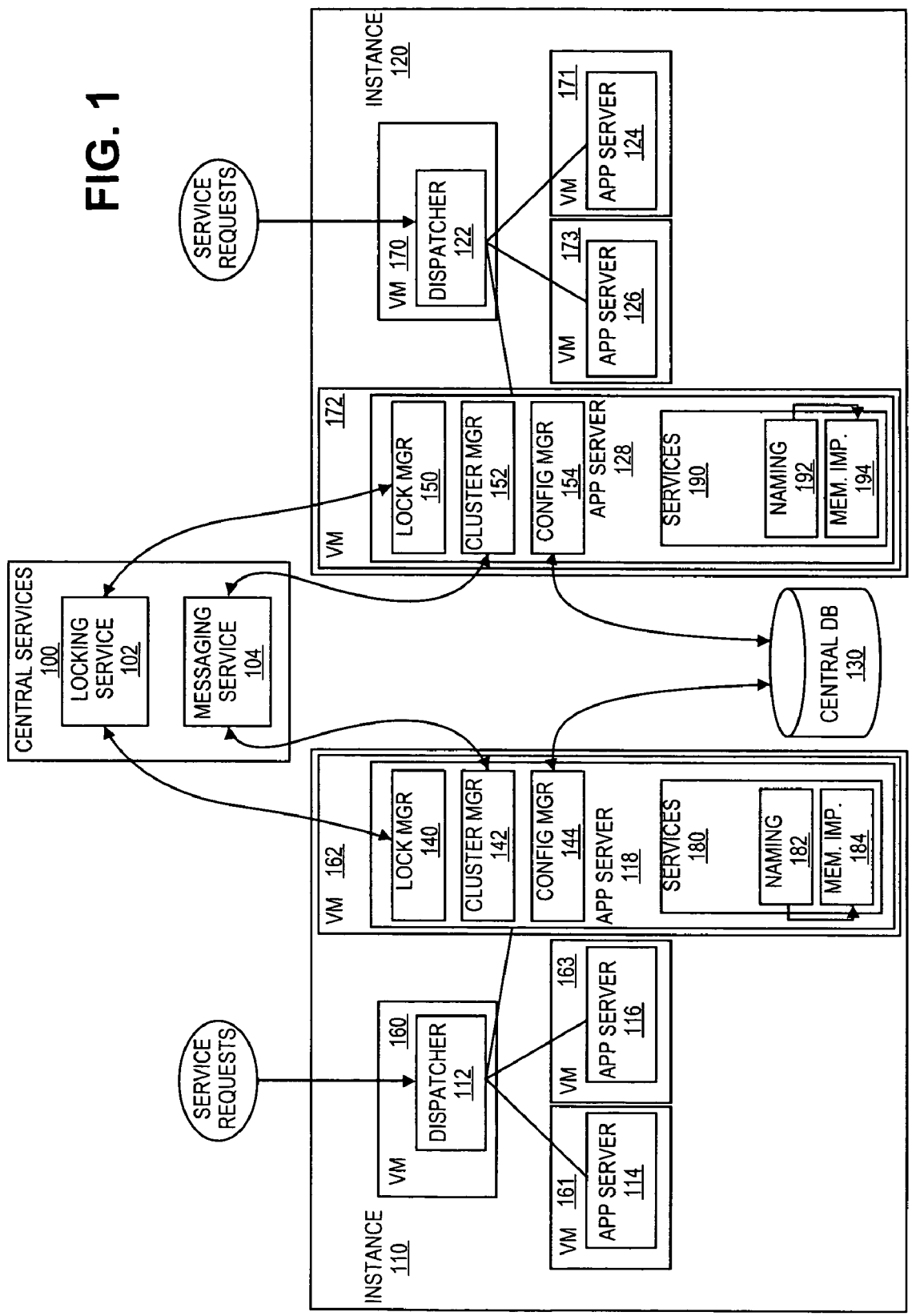
FIG. 1 is a block diagram of an application server architecture employing in one embodiment of the invention.

FIG. 1 is a block diagram of an application server architecture employing in one embodiment of the invention. The architecture includes central services "instance" 100 and a plurality of application server "instances" 110, 120. As used herein, application server instances, 110 and 120, each include a group of server nodes 114, 116, 118 and 124, 126, 128, respectively, and a dispatcher, 112, 122, respectively. Each application server node 114, 116, 118 and 124, 126, 128 and each dispatcher is resident in a virtual machine (VM) 160-163, 170-173. In one embodiment, the VM may be a Java Virtual Machine (JVM). Central services instance 100 includes locking service 102 and messaging service 104 (described below). The combination of all of the application instances 110, 120 and central services instance 100 is referred to herein as a "cluster." Although the following description focuses primarily on instance 110 for the purpose of explanation, the same principles apply to other instances such as instance 120.

Server nodes 114, 116, 118 within instance 110 provide the business and/or presentation logic for the network applications supported by the system. Each application server, for example 118 and 128, provides a set of services 180, 190 to the business and/or presentation logic. Among the services provided is naming service 182, 192. In one embodiment, the naming service 182, 192 stores data and objects resulting from naming operations, referred to collectively as "naming data", in the memory implementation 184, 194 of its respective virtual machine 162, 172. The memory implementation 184, 194 by its nature is non-persistent; As a result, when a server goes down and reboots the naming data is not retained. Accordingly, on reboot, the server is assured of a clear name space. Moreover, because the naming operations are not reliant on a DBMS, efficiency and reliability of the naming service is improved.

Each of the server nodes 114, 116, 118 within a particular instance 110 may be configured with a redundant set of application logic and associated data. In one embodiment, dispatcher 112 distributes service requests from clients to one or more of server nodes 114, 116, 118 based on the load on each of the servers. For example, in one embodiment, a dispatcher implements a round-robin policy of distributing service requests (although various alternate load-balancing techniques may be employed). In one embodiment, the dispatcher performs load balancing on naming service requests from remote clients. However, once a remote client has received an initial context from a certain server node, the subsequent naming requests from that client are directed to the same server node.

In one embodiment of the invention, server nodes 114, 116, 118 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). A J2EE platform complies with the J2EE Standard. In one embodiment, the naming service is compliant with the JNDI Specification. In one embodiment, communication and synchronization between each of instances 110 and 120 is enabled via central services instance 100. As illustrated in FIG. 1, central services instance 100 includes messaging service 104 and locking service 102. Message service 104 allows each of the servers within each of the instances to communicate with one another via a message passing protocol. For example, messages from one server may be broadcast to all other servers within the cluster via messaging service 104. In addition, messages may be addressed directly to specific servers within the cluster (e.g., rather than being broadcast to all servers).

In one embodiment, locking service 102 disables access to (i.e., locks) certain specified portions of program code and/or configuration data stored within a central database 130. Locking managers 140 and 150 employed within the server nodes lock data on behalf of various system components which need to synchronize access to specific types of data and program code (e.g., such as the configuration managers 144 and 154). In one embodiment, messaging service 104 and locking service 102 are each implemented on dedicated servers. However, messaging service 104 and the locking service 102 may be implemented on a single server or across multiple servers while still complying with the underlying principles of embodiments of the invention.

As illustrated in FIG. 1, each server node (e.g., 118, 128) includes a lock manager 140, 150 for communicating with locking service 102; a cluster manager 142, 152 for communicating with messaging service 104; and a configuration manager 144, 154 for communicating with central database 130 (e.g., to store/retrieve configuration data). Although lock managers 140 and 150, cluster managers 142 and 152, and configuration managers 144 and 154 are illustrated with respect to particular server nodes, 118 and 128, in FIG. 1, each of the server nodes 114, 116, 124 and 126 and/or on the dispatchers 112, 122 may be equipped with equivalent lock managers, cluster managers, configuration managers, and services.

Figure 2:
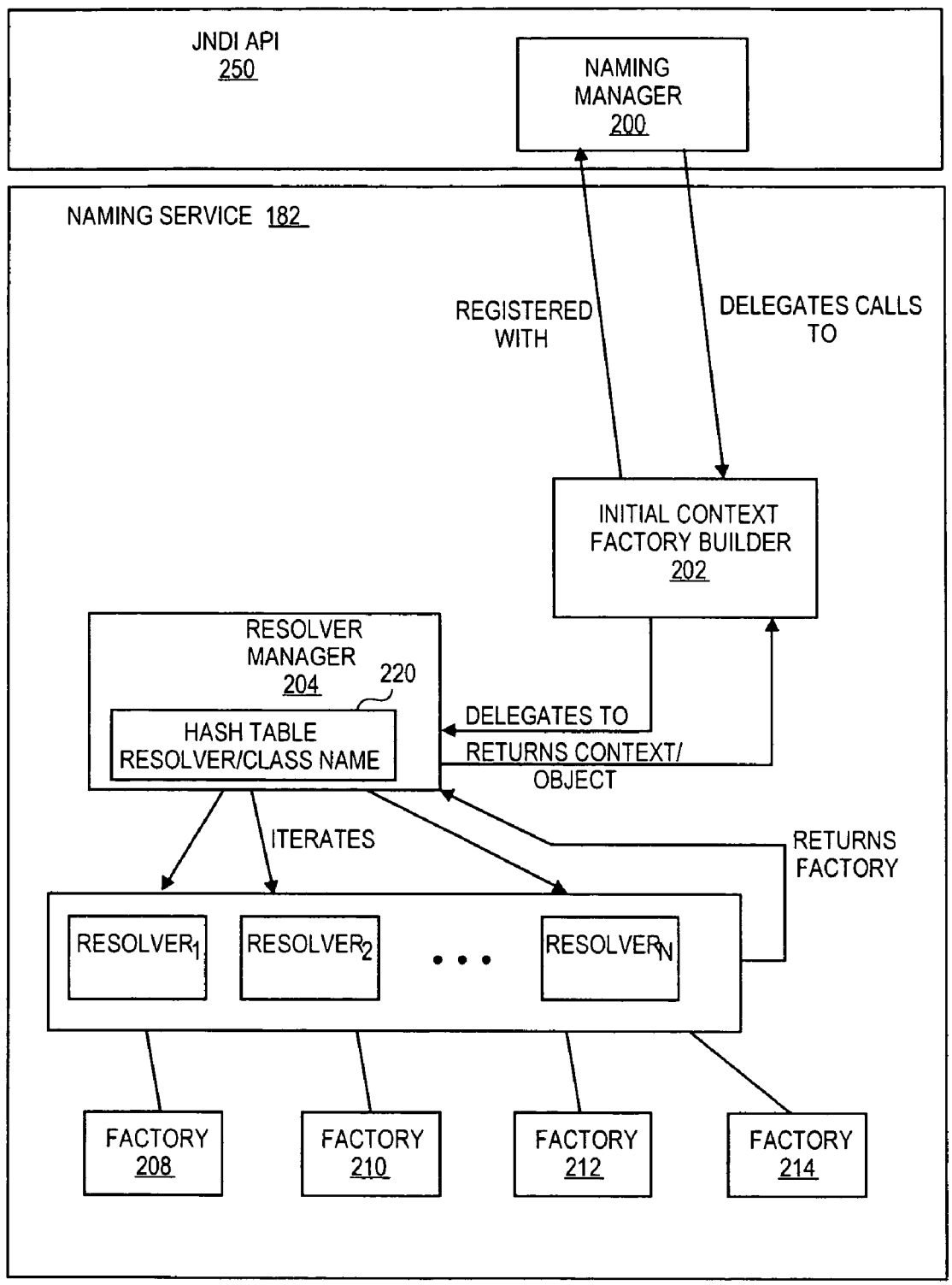
FIG. 2 is a block diagram of a naming service of one embodiment of the invention.

FIG. 2 is a block diagram of a naming system of one embodiment of the invention. The JNDI application programming interface (API) provides a naming manager 200 to handle incoming naming requests. These requests often indicate a type of factory required to service the request. In one embodiment, naming manager 200 is javax.naming.spi.NamingManager. An initial context factory builder 202 registers with naming manager 200. In one embodiment, only a single initial context builder 202 may be registered with the naming manager 200. When naming manager 200 receives a request from a client for a context or object, the naming manager delegates the call to initial context factory builder 202. Initial context factory builder 202 in turn delegates the call to resolver manager 204.

A plurality of resolvers 206 which includes $resolver_1$, $resolver_2$ ... $resolver_n$ register with the resolver manager 204. "Resolver" as used herein, broadly means a provider of one or more factories. A resolver may provide any subset of the four supported factory types. In one embodiment, the resolver manager 204 retains a hash table 220 of registered resolvers against class names. In other embodiments, the resolver manager may maintain a listing of registered resolvers in another type of data structure. In response to a request, resolver manager 204 iterates serially through the resolvers 206 to find a resolver that can be a source for a factory capable of servicing the request. Each of the resolvers 206 may be able to be a source of one or more factory, such as factory 208, 210, 212 and 214. In one embodiment, factory 208 may be an initial context factory. Factory 210 may be a uniform resource locator (URL) context factory, factory 212 may be a state factory and factory 214 may be an object factory. Of course it is within the scope and contemplation of various embodiments of the invention for multiple factories of each type to be provided. In some embodiments, some clients may have their own factory implementations. By registering the corresponding resolver with the resolver manager, access is assured even if the classes of such factories are not available in the class path of the client.

When looking for a factory, the resolver manager 204 iterates the resolvers 206 and may sequentially determine if a particular resolver can provide a desired factory. If the resolver 206 can return the desired factory, e.g. 214, it returns the factory 214 to the resolver manager 204. If the resolver cannot return the desired factory, it returns null to the resolver manager 204 and the resolver manager 204 proceeds to the next resolver 206 until either the factory is found or no resolvers 206 remain to iterate. If the factory is found, the resolver manager 204 then returns the context or object requested to the initial context factory builder 202 which returns context or object by the naming manager 200 to the requesting client.

Figure 3:
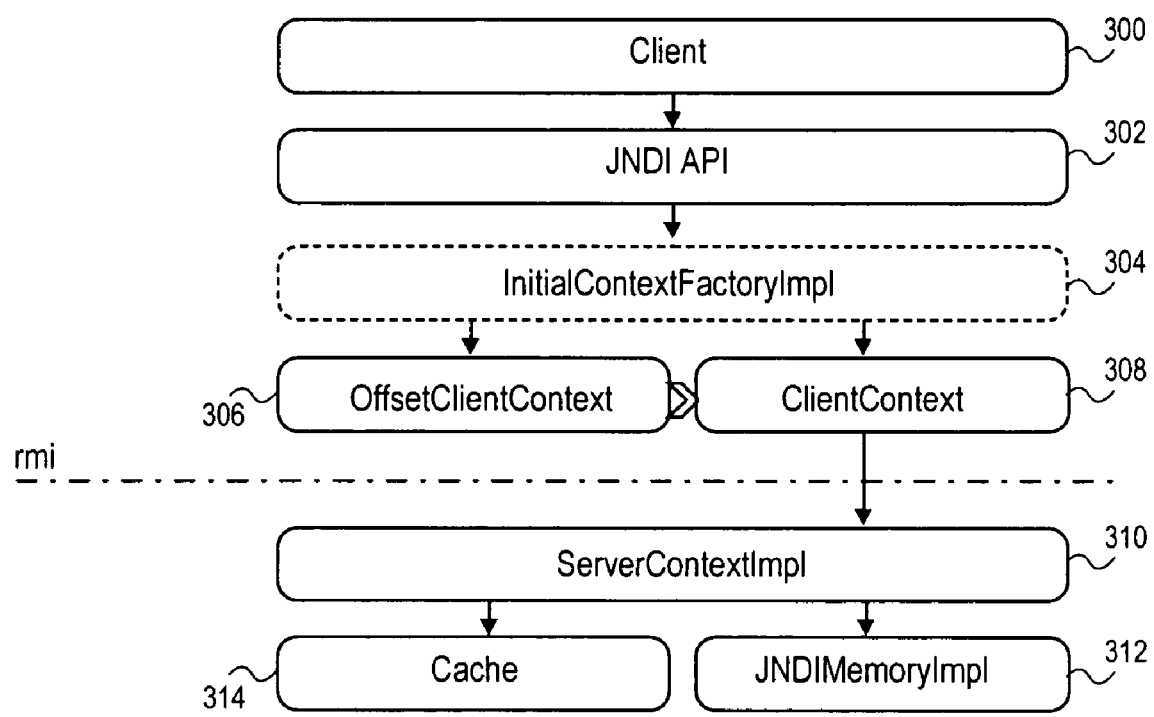
FIG. 3 is a diagram of layers in the naming system architecture in one embodiment of the invention.

FIG. 3 is a diagram of layers in the naming system architecture in one embodiment of the invention. A client source 300 uses a JNDI application programming interface (API) to request an initial context object. The client may be a local client, such as an application running within the same virtual machine as a naming service or may be a remote client defined as any client as not within the same virtual machine as the naming service.

At start up of the naming service, an initial context factory builder is established as a default factory builder in the javax.naming.spi.NamingManager such that a JNDI Application Programming Interface (API) 302 will access the initial context factory builder implementation when an initial context is requested by a client 300. The initial context of factory builder will provide a proper initial context factory implementation 304 depending on the environment properties supplied by the client. The initial context factory implementation 304 will return either offset client context 306 or client context 308 depending on the properties of the environment. Client Context always returns the root context, which is an abstraction that forms a starting point for all subsequent naming operations. The returned context may then be organized under the root context or any subcontext within the naming tree dependent on the rights of the client. In one embodiment, only applications will be provided an instance of offset client context 306. Offset client context 306 is an extension of client context 308 and indicates that the context is other than the root context. This prevents application from accessing or creating objects higher up the naming tree. Applications are allowed to perform naming operations only in their own namespace, e.g. the context returned as initial context and the subcontexts created under it.

Client context 308 has an instance of server context interface which will be either server context implementation 310, if a client is local or a stub to the server context implementation if the client is remote. Remote clients may use Remote Method Innovation (RMI) to pass messages to the server context implementation. Local clients can communicate directly without using RMI. In one embodiment, the connection service provides the RMI. Local clients can obtain an initial context without using the connection service or RMI.

Server context implementation 310 is connected to the JNDI memory implementation 312, which functions as the naming repository in one embodiment of the invention. Also, in some embodiments of the invention, server context implementation 310 may be connected to a naming cache 314. Naming cache 314 may be used to increase the speed of lookup operations in the naming system. In one embodiment, the naming cache 314 holds object instances for application clients running on the server and byte arrays of the objects for all other clients.

In one embodiment, JNDIMemoryImpl 312 is the implementation of the non-persistent naming data management within the naming service. JNDIMemoryImpl 312 keeps the hash tables of the containers stored by name and by ID and a handle to the root container object, which keeps hash tables of all the objects and subcontexts that can be found in the root context of the naming system stored by name and ID. All other containers have the same structure as the root container but are available for direct access. Thus the whole hierarchical tree like structure of objects and contexts in a naming system may be organized in hash tables with only two levels of nesting.

Figure 4:
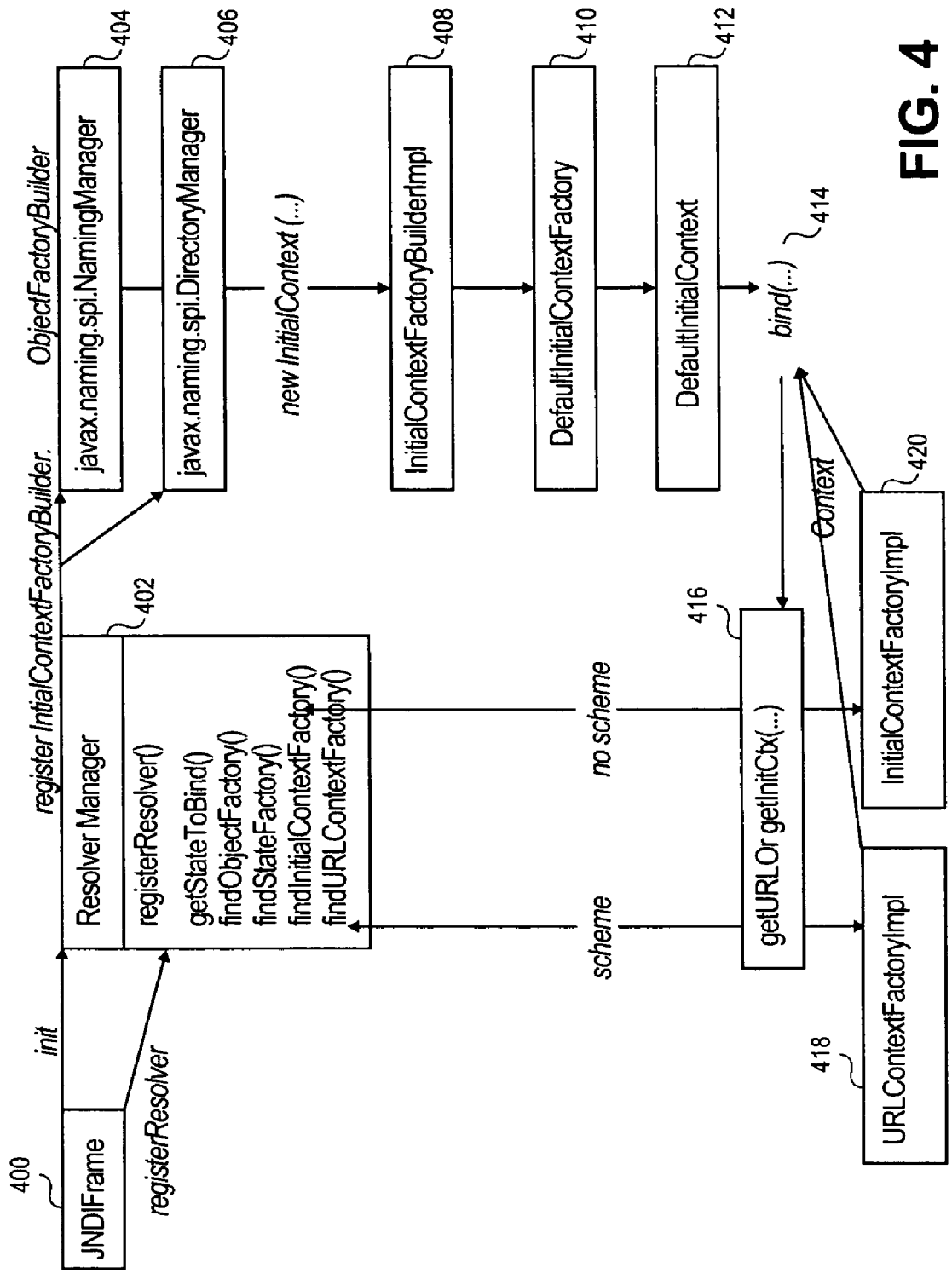
FIG. 4 is a diagram of a getting an initial context within the naming service of one embodiment of the invention.

FIG. 4 is a diagram of a getting an initial context within the naming service of one embodiment of the invention. A JNDI frame 400 controls the lifecycle of the service. When the start method of JNDIFrame is called resolver manager 402 is already instantiated. Resolver manager 402 registers the initial context factory builder and object factory builder with the javax.naming.spi.NamingManager/javax.naming.spi.DirectoryManager 404/406 (naming manager/directory manager). At first there are no resolvers registered within the resolver manager 402 so it has the same basic logic of retrieving the factory objects by class name as the naming manager 404. When the naming service is started it registers in the resolver manager 402 its own resolver containing all the provided factory implementations. This is done by the JNDI Frame 400.

Resolver manager 402 is initialized early in the start up process of the engine. Resolver manager 402 includes a number of methods including findObjectsFactory( ), findStateFactory( ), findInitialContextFactory( ), findURLContextFactory( ) and getStateToBind( ). These methods are used are used to iterate through the registered resolvers until an appropriate factory is found. In one embodiment, iterating involves inquiring of each resolver if it is capable of providing the requested factory. In one embodiment, the resolver returns either null if it cannot provide the factory or the factory if available. In one embodiment, if a resolver throws a naming exception, no further attempts to get the factory are tried.

When a new initial context is requested by a server side client, the naming/directory manager 404, 406 delegates the call to initial context factory builder 408. The initial context factory builder 408 may be called directly by naming manager 404. Initial context factory builder 408 provides a default initial factory 410 which creates a default initial context 412. Default initial context 412 is returned to the naming/directory manager 404, 406 and occupies a spot in the naming tree.

However, the default initial context is basically a null context until the first naming operation over that context, such as bind operation 414. In response to the first naming operation over the default initial context 412 depending on whether a scheme is identified in the name getURLContext( ) or getInitialContext( ) 416 is invoked which uses resolver manager 402 to invoke either a find URL context factory or a find initial context factory method respectively. A scheme is generally indicated by the presence of a colon in the name. A scheme indicates that the name is a reference to the name of the object rather than the name of the object itself. If present, the scheme is resolved by a getURLContext( ) method 416. If no scheme is present or after the scheme is resolved, the environment properties of the initial context are checked. Resolver manager uses the find methods to iterate through the registered resolvers and return either URL context factory implementation 418 or initial context factory implementation 420 satisfying the environment properties responsive to the bind 414. Because the resolver manager can access any resolver that is registered with it, clients are able to access factories that are not present in the client's classpath. As a result, the factories available to a client are independent of its class loader.

Figure 5:
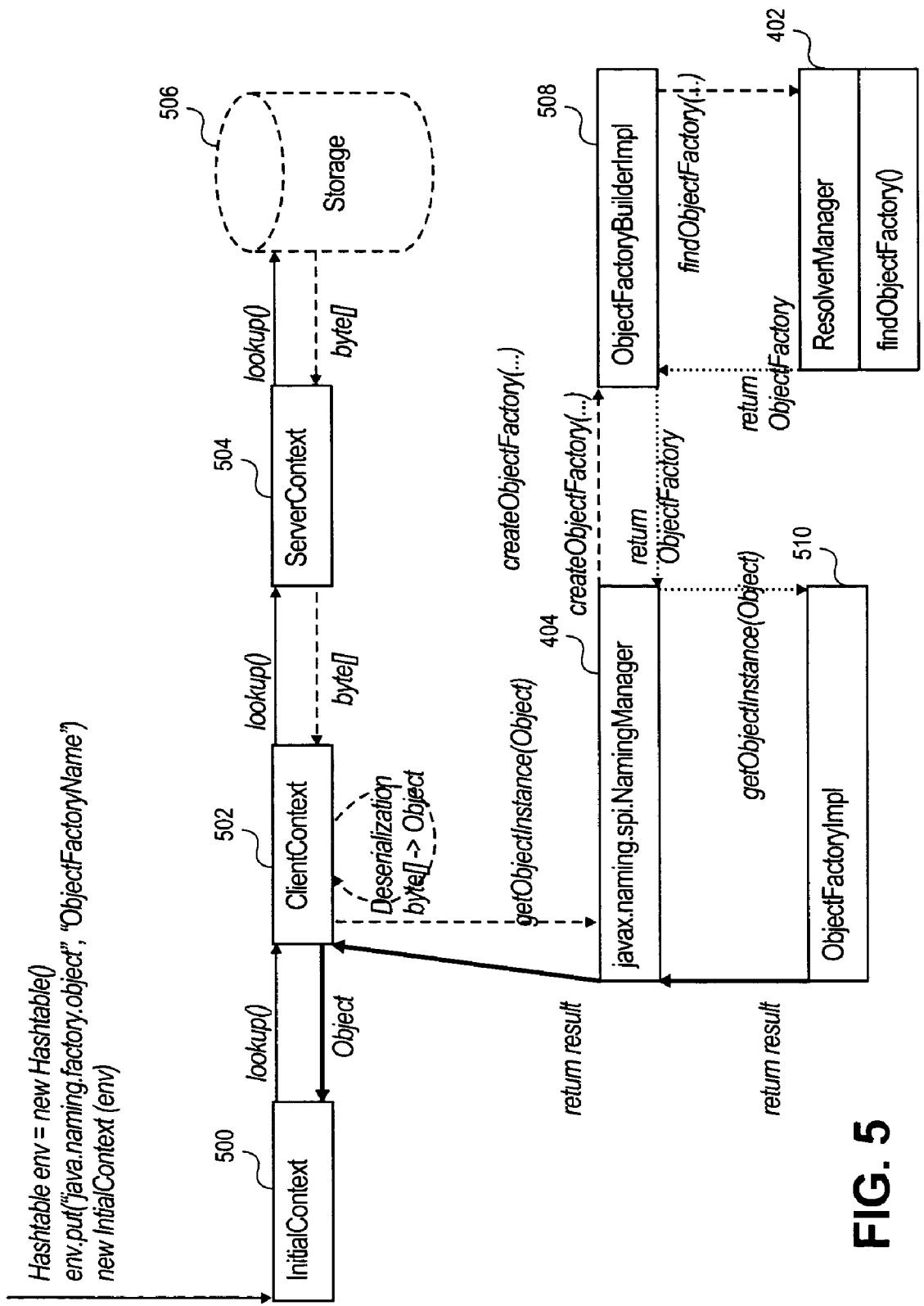
FIG. 5 is a diagram of a lookup operation in one embodiment of the invention.

FIG. 5 is a diagram of a lookup operation in one embodiment of the invention. To perform naming operations, a client must get an initial context. This may be done as described with reference to FIG. 4 above. A new initial context with the object factory name as one of the environment properties is requested. A new initial context having the specified environmental properties is returned as initial context 500. In one embodiment, initial context 500 is a client context 502 having the specified environment properties. A lookup is performed over client context 502 which in turn calls to server context 504 which performs a lookup in storage 506. In one embodiment, storage 506 may be a memory implementation, such as memory implementation 184 shown in FIG. 1. Responsive to the lookup, storage 506 returns a byte array for the object requested. A byte array is passed from the server context 504 to the client context 502. The client context 502 deserializes the byte array to recover the object.

Using the object as the argument, a call is then made to a getObjectInstance( ) method of the naming manager 404. Naming manager 404 calls createObjectFactory( ) to instantiate an object factory implementation 508. Object factory builder implementation 508 if registered delegates the call to the resolver manager 402 which invokes its findObjectFactory( ) method to iterate through the registered resolvers and return of the appropriate object factory. An object factory implementation meeting the client's requirements is returned by the object factory builder implementation 508. The naming manager 404 delegates the getObjectInstance(object) with the object previously deserialized as the argument to the object factory implementation 510. Object factory implementation 510 then makes the necessary transformations over the object and returns the result to naming manager 404 which returns it back to the client as a result of the lookup operation.

Figure 6:
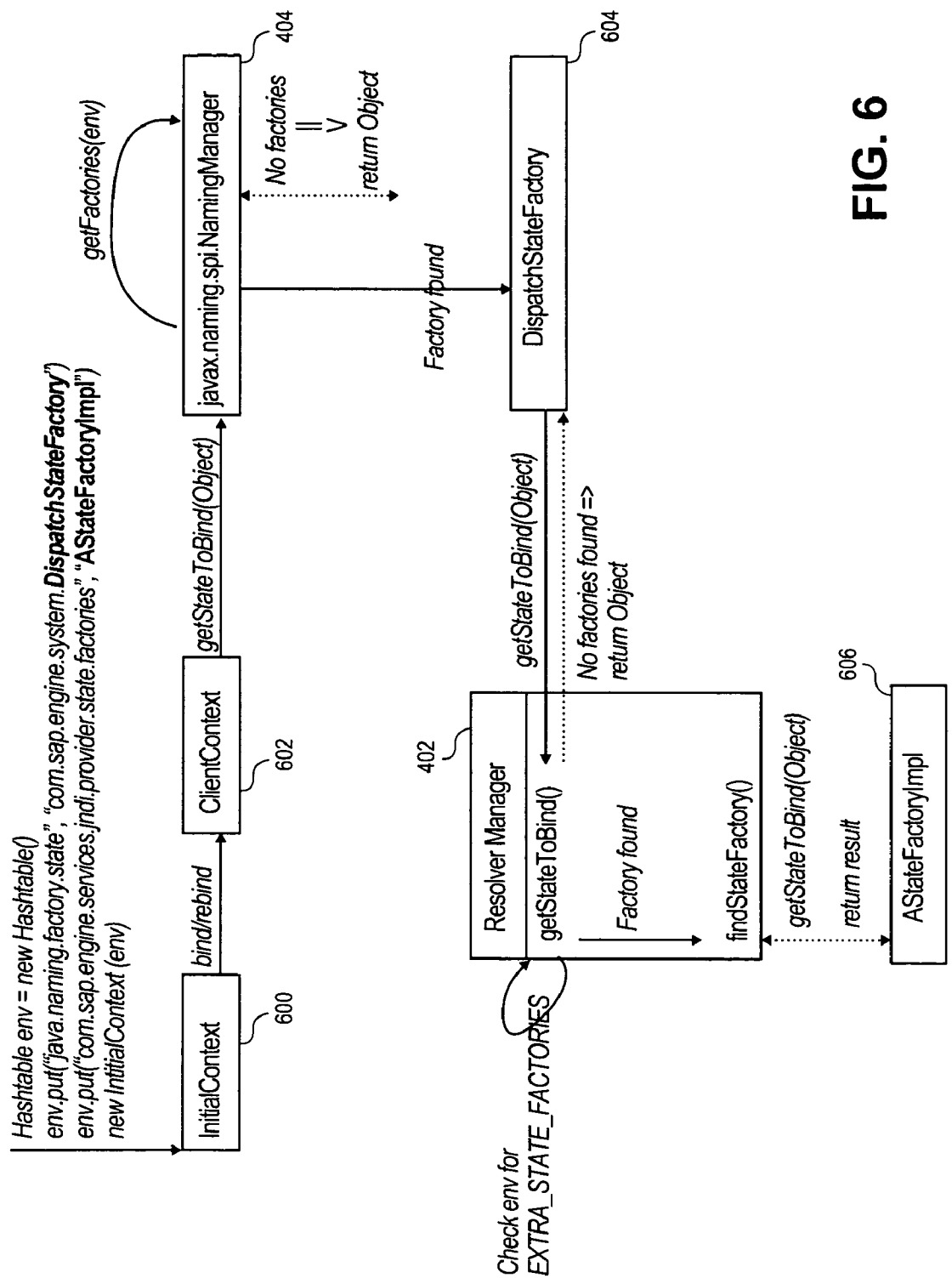
FIG. 6 is a diagram of bind/rebind operation in one embodiment of the invention.

FIG. 6 is a diagram of bind/rebind operation in one embodiment of the invention. As noted above with reference to FIG. 5, a client must first obtain an initial context to perform naming operations. For bind and rebind, a state factory may be used within that initial context to change the object to be bound or rebound before storage in the repository, e.g. the memory implementation. Accordingly, an initial context is requested with the state factory name as one of the environmental properties. In one embodiment, a nonstandard property is included in the environment properties that permits the client to exactly specify which state factory is to be used. As used herein "nonstandard property" means a property that is not a JNDI default property. The client puts the class name of the desired factory as the value of this nonstandard property. In this example, "A stateFactoryImpl" is put as a value of the nonstandard environment property com.sap.engine.services.jndi.provider.state.factories. Multiple state factory names may be listed. That initial context 600 may be returned as described with reference to FIG. 4. In one embodiment, the initial context is a client context instance possessing a server context implementation object as a field. The bind or rebind is performed over the client context 602. A getStateToBind method with the object to be bound or rebound as an argument is invoked within naming manager 404. Naming manager 404 calls a getFactories method to find the factories specified by the client. Thus, if more than one state factory is indicated in the environment properties, the naming manager 404 will attempt to find each in turn until one capable of servicing the request is found. If none of the environment properties identify a state factory, the Naming Manager 404 merely returns the object. However, since the client specified the dispatcher state factory 604, that factory will be found. The naming manager 404 does not 'know' about the non standard property specifying the class names of the state factories the client wants to use so it finds only the value of the standard "java.naming.factory.state" property, in this example, "com.sap.engine.system.DispatchStateFactory".

While the dispatcher state factory 604 is recognized by the naming manager 404 and perceived as being a state factory, it is not really a factory at all, rather it serves to redirect/delegate factory requests to the resolver manager 402. The dispatcher state factory 604 delegates the call to the resolver manager 402. In one embodiment, the delegation involves the dispatcher state factory 604 invoking the getStateToBind method in the resolver manager 402. In one embodiment, all the factories are provided by the JNDI specification as interfaces. Each interface specifies the signature of the methods that an implementation of this interface should have. Accordingly, naming providers provide implementation of these factory interfaces, which means that if an object is an implementation of a certain interface this object implements all the methods described in the interface. For example, since ResolverManager implements the StateFactory interface, which means that it implements the getStateToBind method that is described in the StateFactory interface and is common for all state factory implementations. In this way all the state factory implementations can be accessed in a common way.

In one embodiment, the dispatcher state factory 604 can be loaded from a frame class loader, which is the parent of all other class loaders in the server. The resolver manager 402 checks the environment properties for extra state factories using the getStateToBind method with the object as its argument. This may take the form of checking the nonstandard environment property for a class name. If factories are found, the resolver manager 402 iterates the resolvers in the system until a resolver capable of providing the specified factory is found or all resolvers have returned null. If the factory implementation 606 is found, it changes the object and returns the result. If no factories are found, the resolver manager 402 returns the object.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method of providing access to factories in a naming system, the method comprising:
   receiving an indication that a factory is needed, the factory indicated by a request for context and an environment property from a server computer;
   iterating through a plurality of resolvers in the naming system by a resolver manager resident in a virtual machine associated with the naming system, to identify a source for the factory based at least in part on the received environment property; and
   if the source for the factory is identified, acquiring the factory, modifying the context with the acquired factory, and returning the modified context for the request.

2. The method of claim 1 further comprising:
   associating a factory builder with a naming manager.

3. The method of claim 2 wherein associating comprises:
   registering the factory builder with a Java naming and directory interface (JNDI) manager.

4. The method of claim 1 further comprising:
   delegating a call from a naming manager to the resolver manager.

5. The method of claim 4 wherein delegating comprises:
   instantiating a dispatcher state factory from the naming manager;
   invoking a method in the resolver manager from the dispatcher state factory.

6. The method of claim 5 further comprising:
identifying the dispatcher factory from the environment property, the environment property being an environment property of an argument of the call; and
identifying a desired state factory from a nonstandard environment property of the argument.

7. The method of claim 4 wherein delegating comprises:
delegating the call from a naming manager to a registered object factory builder; and
delegating the call from the registered object factory builder to the resolver manager.

8. The method of claim 1 wherein iterating comprises:
invoking a method to find one of an object factory, an initial context factory, a state factory and a uniform resource locator (URL) factory in each of the plurality of resolvers until the factory is found or all resolvers have been checked.

9. The method of claim 1 further comprising:
returning a default initial context instance;
checking for a scheme responsive to a first naming operation over the default initial context; and
resolving the scheme if found; and
checking the environment properties for an initial context factory name if no scheme is found.

10. The method of claim 1 wherein iterating comprises:
inquiring if a resolver can provide the factory;
receiving a null response if the resolver cannot provide the factory;
inquiring with a subsequent resolver if the resolver cannot provide the factory; and
discontinuing inquiries with other resolvers if the resolver can provide the factory.

11. The method of claim 1, wherein the indication that a factory is needed forms part of the request for the context by the server computer, the request indicating the factory required to service the request.

12. The method of claim 11, wherein iterating comprises determining whether a first resolver in the plurality of resolvers can provide the factory based at least in part on the environment property, and iterating through each resolver once in the plurality of resolvers until the factory is acquired, the method further comprising responding to the request with the context not modified by the factory if the factory is not acquired after iterating once through each resolver in the plurality of resolvers.

13. The method of claim 11, further comprising responding to the request by the server computer with the context modified by the factory, if the factory is acquired.

14. A machine-readable storage medium containing instructions that, when executed, cause a machine to:
receive an indication that a factory is needed, the factory indicated by a request for context and an environment property from a server computer;
iterate through a plurality of resolvers in a naming system, to identify a source for the factory based at least in part on the received environment property; and
if the source for the factory is identified, acquire the factory, modify the context with the acquired factory, and return the modified context for the request.

15. The machine-readable storage medium of claim 14 wherein instructions further cause the machine to:
associate a factory builder with a naming manager.

16. The machine-readable storage medium of claim 15 wherein instructions causing the machine to associate comprise instructions to cause the machine to:
register the factory builder a Java naming and directory interface (JNDI) manager.

17. The machine-readable storage medium of claim 15 wherein instructions further cause the machine to:
redirect a call to a JNDI application programming interface (API) to the factory builder.

18. The machine-readable storage medium of claim 14 wherein instructions further cause the machine to:
delegate a call from a naming manager to a resolver manager.

19. The machine-readable storage medium of claim 14 wherein instructions causing the machine to iterate comprise instructions to cause the machine to:
invoke a method to find one of an object factory, an initial context factory, a state factory and a uniform resource locator (URL) factory in each of the plurality of resolvers until the factory is found or all resolvers have been checked.

20. The machine-readable storage medium of claim 14 wherein instructions further cause the machine to:
return a default initial context instance;
check for a scheme responsive to a first naming operation over the default initial context;
resolve the scheme if found; and
check the environment properties for an initial context factory name if no scheme is found.

21. The machine-readable storage medium of claim 14 wherein instructions causing the machine to iterate comprise instructions to cause the machine to:
inquire if a resolver can provide the factory; and
receive a null response if the resolver cannot provide the factory.

22. The machine-readable storage medium of claim 14, wherein the indication that a factory is needed forms part of request for the context by the server computer, the request indicating the factory required to service the request.

23. The machine-readable storage medium of claim 22, wherein instructions causing the machine to iterate through the plurality of resolvers comprise instructions to:
determine whether a first resolver in the plurality of resolvers can provide the factory based at least in part on the environment property; and
iterate through each resolver once in the plurality of resolvers until the factory is acquired, the instructions further causing the machine to respond to the request with the context not modified by the factory if the factory is not acquired after iterating once through each resolver in the plurality of resolvers.

24. The machine-readable storage medium of claim 22, wherein the instructions further cause the machine to respond to the request by the server computer with the context modified by the factory, if the factory is acquired.

25. A computer-implemented method comprising:
receiving a request for a context by a server computer, the request indicates a factory required to service the request;
receiving an environment property by the server computer;
registering a plurality of resolvers in a naming system with a resolver manager;
determining whether a first resolver in the plurality of resolvers can provide the factory based at least in part on the environment property;
acquiring the factory if the first resolver can provide the factory;
receiving a null indication if the first resolver cannot provide the factory;
iterating through each resolver once in the plurality of resolvers until the factory is acquired;

responding to the request by the server computer with the context not modified by the factory if the factory is not acquired after iterating through each resolver once in the plurality of resolvers;

modifying the context with the factory after the factory is acquired; and responding to the request by the server computer with the context modified by the factory if the factory is acquired.

26. A system comprising:

means for receiving an indication that a factory is needed, the factory indicated by a request for context and an environment property from a server computer;

means for iterating through a plurality of resolvers in a naming system, to identify a source for the factory based at least in part on the received environment property; and means for acquiring the factory, modifying the context with the acquired factory, and returning the modified context for the request, if the source for the factory is identified.

* * * * *